Patented Dec. 1, 1942

2,303,972

UNITED STATES PATENT OFFICE 2,303,972

SULPHANILYL GUANYLUREAS AND PROCESS FOR MAKING THEM

Philip Stanley Winnek, Riverside, Conn., assignor to American Cyanamid Company, New York, N. Y., a corporation of Maine No Drawing. Application November 9, 1940, Serial No. 365,009

11 Claims. (Cl. 260—397.7)

The present invention relates to a new class of chemical compounds and methods for their preparation. More particularly it relates to p-substituted benzenesulphonylguanylurea compounds and guanylthiourea compounds.

This new class of chemical compounds are those represented by the following general formula:

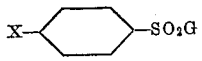

in which X represents amino or a substituted amino radical, such as alkylamino, arylamino, aralkylamino and the like or a radical convertible into an amino group including radicals such as nitro, acylamino, halogen, and azo radicals, and G represents a guanylurea or a guanylthiourea radical, also the salts of such compounds.

The compounds of this invention are useful as chemotherapeutic agents and also as intermediates in the preparation of other compounds.

In general the compounds of the present invention may be prepared by reacting a p-Y-benzenesulphonyl halide with guanylurea or guanylthiourea, in which Y represents a radical convertible into an amino group including radicals such as nitro, acylamino, halogen and azo radicals. These compounds may then be converted into the compounds of the general formula in which X is an amino group, by hydrolysis of the acylamino group by reduction of the nitro and azo groups or by reaction of the halogen group with ammonia.

In the reaction between a guanylurea or a guanylthiourea and the sulphonyl halides a hydrogen halide is liberated, and it is therefore desirable where a good yield is to be obtained to provide a basic substance which will unite with the hydrogen halide evolved. This may be effected by carrying out the reaction in a suitable medium and adding an excess of sodium hydroxide or other alkali. In the preparation of p-nitrobenzenesulphonylguanylurea compounds or p-nitrobenzensulphonylguanylthiourea compounds the reaction may be carried out in the presence of a basic reacting medium such as pyridine, in which case it is not necessary to add the sodium hydroxide. The p-acetylaminobenzenesulphonylguanylurea and guanylthiourea compounds can be prepared by reacting p-acetylaminobenzenesulphonyl chloride with a guanylurea or a guanylthiourea when the reaction is carried out in the presence of an organic liquid such as acetone, isopropanol, tertiary butyl alcohol, dioxane, or the like and keeping the reaction medium on the alkaline side by the addition of sodium hydroxide.

The invention will be described in greater detail in conjunction with the following specific examples which are merely illustrative of the preferred methods of preparing representative compounds of the class and are not intended to limit the scope of the invention. The parts are by weight except in the case of liquids which are expressed in corresponding parts by volume.

Example 1 p-Acetylaminobenzenesulphonylguanylurea

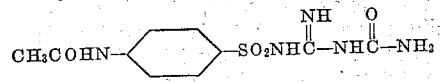

16.5 parts of guanylurea nitrate are suspended in 110 parts of acetone. 10 parts of sodium hydroxide dissolved in 20 parts of water are added. The mixture is cooled to 15° C. and 25 parts of N-acetylsulphanilyl chloride are added gradually with vigorous stirring and with the temperature maintained at 15°–18° C. The reaction mixture is then stirred for 1 hour allowing the temperature to rise to 25° C. The mixture is then filtered and the filtrate evaporated under reduced pressure to remove acetone. Sufficient sodium hydroxide solution is added to the concentrated filtrate to dissolve solid material which had separated and the solution is treated with decolorizing charcoal and filtered. The filtrate is neutralized with acetic acid which precipitates the p-acetylaminobenzenesulphonylguanylurea. It is purified by crystallization from water.

Example 2 p-Nitrobenzenesulphonylguanylurea

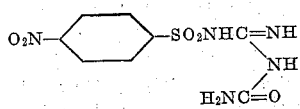

14 parts of guanylurea hydrochloride are suspended in 25 parts of anhydrous pyridine. 25 parts of p-nitrobenzenesulphonyl chloride are added gradually with vigorous stirring and with the temperature kept between 50°–60° C. by warming on the steam bath. The reaction mixture is then heated to 80°–90° C. for one and one-half hours with continuous stirring. It is then cooled and 500 parts of water are added. The crude p-nitrobenzenesulphonylguanylurea separates as a yellow, tarry material which on standing with water turns to a solid. It is purified by crystallization from acetic acid.

Example 3

Sulphanilylguanylurea

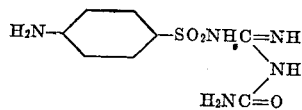

15 parts of p-nitrobenzenesulphonylguanylurea are suspended in 200 parts of hot water containing two parts of glacial acetic acid. The mixture is stirred vigorously and 40 parts of iron dust are added gradually. The reaction mixture is stirred and heated on a steam bath under reflux for several hours. It is then made alkaline with sodium hydroxide, filtered hot and the filtrate made neutral with dilute acetic acid. On cooling the sulphanilylguanylurea crystallizes out. Additional product is obtained by extracting the iron cake with hot alcohol. The sulphanilylguanylurea is purified by crystallization from an alcohol-water mixture.

Example 4

Sulphanilylguanylurea

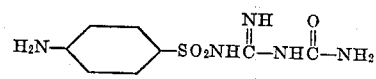

2.5 parts of $N^4$-acetylsulphanilylguanylurea are suspended in 75 parts of 6N hydrochloric acid and heated until all the solid material is dissolved. The solution is then gently boiled for three minutes and poured onto 150 parts of ice. The resulting cold solution is stirred with decolorizing charcoal for ½ hour and filtered. On neutralizing the filtrate with sodium hydroxide the sulphanilylguanylurea separates out as a white solid. It is purified by crystallization from water or dilute alcohol and is identical with the product obtained in Example 3.

Example 5 p-Nitrobenzenesulphonylguanylthiourea

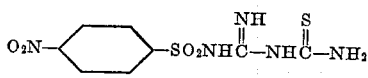

12 parts of guanylthiourea are suspended in 25 parts of anhydrous pyridine and 25 parts of p-nitrobenzenesulphonyl chloride are added gradually with vigorous stirring and at such a rate that the temperature is maintained at 45°–50° C. The reaction mixture is then stirred for 1½ hours and is warmed on a steam bath to 50°–65° C. 200 parts of water are added which causes the separation of a gummy precipitate. Sodium hydroxide solution is added until most of the precipitate dissolves and the mixture is heated to remove pyridine. Water is added from time to time to maintain the volume. The mixture is treated with decolorizing charcoal and filtered. The filtrate is neutralized with acetic acid and on cooling the p-nitrobenzenesulphonylguanylthiourea crystallizes out as a yellow solid. It is purified by crystallization from isopropyl alcohol.

Example 6

Sulphanilylguanylthiourea

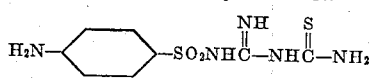

9.5 parts of p-nitrobenzenesulphonylguanylthiourea are added to a hot suspension of 20 parts of iron dust in 100 parts of absolute alcohol containing 1.5 parts of concentrated hydrochloric acid. The mixture is stirred and heated under reflux for several hours. It is then made neutral with sodium hydroxide solution and filtered. The filtrate is concentrated on the steam bath to ¼ its volume. On cooling the sulphanilylguanylthiourea separates out as a white solid. It is purified by crystallization from a small volume of water using zinc dust and charcoal to remove color.

In Example 1 above the p-acetylaminobenzenesulphonyl chloride was used in carrying out the reaction. The acetyl compound is preferred because of its cheapness and availability. However, it is to be understood that other acyl compounds may be used including those such as propionyl, butyryl, benzoyl, and the like. Similarly, instead of p-acetylaminobenzenesulphonyl chloride the corresponding p-acetylaminobenzenesulphonyl bromide may be used.

In the foregoing examples unsubstituted guanylurea and unsubstituted guanylthiourea were used in carrying out the reactions. These unsubstituted compounds may be replaced by substituted guanylureas or substituted guanylthioureas as long as the guanylurea or guanylthiourea radical contains a group which will react with a sulphonyl halide. Suitable substituted guanylurea and guanylthiourea compounds may therefore be the various mono- and di-substituted guanylureas and guanylthioureas, such as mono- and dimethyl, diphenyl, diethanol, and the like. Similar compounds such as guanylurea sulphonic acids, guanylurea anthranilate, guanylurea sulphamate, and the like, may also be used.

Alkylamino, arylamino, aralkylamino, mono-aldose amino, and sodium formaldehyde sulphoxylate amino derivatives of compounds prepared by the foregoing methods may be prepared by known methods, such as by the use of acyl, alkyl, aralkyl halides, mono-aldose sugar, or an alkali metal sulphoxylate.

Neither is the present invention limited to any particular method for preparing the salts of p-aminobenzenesulphonylguanylurea or p-aminobenzenesulphonylguanylthiourea. They will combine with any inorganic or organic acid and form salts therewith and also with alkali metals to form salts therewith. The ordinary inorganic salts, such as the hydrochlorides, sulphates, phosphates, chlorates, and the like, may be prepared by adding the p-amino compound to a relatively strong aqueous solution of the acid. A salt produced by the reaction may be very conveniently recovered by diluting the aqueous solution with an organic solvent such as acetone and recovering the resulting precipitate by filtration. The salts of the water soluble organic acids, such as for example, acetic, lactic, citric, and the like, may be prepared as described in the process above. Another suitable method for preparing the salts comprises a method in which a relatively water insoluble organic acid, such as benzoic, is dissolved in an organic solvent, for example ethyl alcohol, and the p-amino compound added to this solution, in which case the salt may be recovered by any convenient means as for example by evaporating the solution to dryness. Still another method for preparing salts in accordance with the present invention comprises a process in which p-aminobenzenesulphonylguanylurea hydrochloride or guanylthiourea hydrochloride, preferably in the form of an aqueous solution, is reacted with substantially one molecular proportion of the sodium salt of an organic acid, for example, sodium phthalate, also preferably in aqueous solution and the acid salt separated from the sodium chloride.

It is readily seen, therefore, that the present invention relates to and includes any inorganic acid salt. Similarly this invention includes any organic acid salt of p-aminobenzenesulphonylguanylurea or p-aminobenzenesulphonylguanylthiourea including the saturated and unsaturated hydroxy, halogenated or other substituted acids of the aliphatic, alicyclic, aromatic, and heterocyclic series. Preferably the salts are those produced from relatively non-toxic organic acids or those having some bactericidal or other therapeutic property, including acids such as acetic, salicylic, mandelic, lactic, and the like.

The alkali metal salts can be produced directly by a reaction of the compounds with an alkali metal hydroxide in concentrated aqueous solution. Warming on a steam bath is advantageous in bringing about salt formation. The salt can be crystallized out on cooling, or if desired, crystallization from absolute alcohol can be effected. Salts of the heavy metals such as gold, copper, iron, and the like, can be obtained by a reaction of an aqueous solution of the alkali metal salts with a solution of the desired heavy metal salt. The salts of the heavy metals are either insoluble or have such a low degree of solubility that they readily precipitate out of solution.

The above description and examples are intended to be illustrative only. Any modification of or variation therefrom which conforms to the spirit of the invention is intended to be included within the scope of the claims.

I claim:

1. Compounds of the group consisting of those represented by the following general formula:

in which G is a radical of the group consisting of guanylureas and guanylthioureas, and salts thereof.

2. Compounds of the group consisting of those represented by the following general formula:

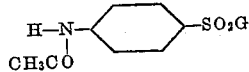

in which G is a radical of the group consisting of guanylureas and guanylthioureas, and salts thereof.

3. The compound having the following formula:

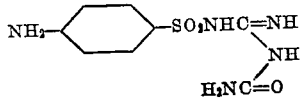

4. The compound having the following formula:

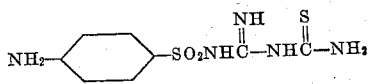

5. A process which comprises reacting a compound of the group consisting of guanylureas and guanylthioureas with a p-acetylaminobenzenesulphonyl halide.

6. A process which comprises reacting a compound of the group consisting of guanylureas and guanylthioureas with a p-acetylaminobenzenesulphonyl halide, separating the resulting reaction product and removing the acetyl group by hydrolysis.

7. The process of producing p-aminobenzenesulphonylguanylurea which comprises reacting guanylurea with p-acetylaminobenzenesulphonylchloride and hydrolyzing the resulting acetyl compound to the amino compound.

8. The process of producing p-aminobenzenesulphonylguanylthiourea which comprises reacting guanylthiourea with p-acetylaminobenzenesulphonyl chloride and hydrolyzing the resulting acetyl compound to the amino compound.

9. A compound of the group consisting of those represented by the following general formula and inorganic and carboxylic acid salts thereof:

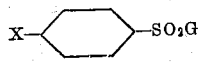

in which X is a member of the group consisting of amino radicals, radicals hydrolyzable to an amino group, and radicals reducible to an amino group, and G is a member of the group consisting of guanylurea, and guanylthiourea radicals.

10. A compound of the group consisting of those represented by the following general formula and inorganic and carboxylic acid salts thereof:

in which Y is a group capable of being hydrolyzed to an amino group, and G is a member of the group consisting of guanylurea and guanylthiourea radicals.

11. A compound of the group consisting of those represented by the following general formula and inorganic and carboxylic acid salts thereof:

in which Z is a group capable of being reduced to an amino group, and G is a member of the group consisting of guanylurea and guanylthiourea radicals.

PHILIP STANLEY WINNEK.